(12) United States Patent
Yonemura et al.

(10) Patent No.: US 11,627,115 B2
(45) Date of Patent: Apr. 11, 2023

(54) INFORMATION PROCESSING METHOD, INFORMATION PROCESSING SYSTEM, AND INFORMATION PROCESSING APPARATUS

(71) Applicant: KABUSHIKI KAISHA TOSHIBA, Tokyo (JP)

(72) Inventors: Tomoko Yonemura, Kawasaki Kanagawa (JP); Tsukasa Omino, Tokyo (JP); Yoshikazu Hanatani, Tokyo (JP); Taihei Yamaguchi, Chigasaki Kanagawa (JP); Misaki Komatsu, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 17/446,027

(22) Filed: Aug. 26, 2021

(65) Prior Publication Data

US 2022/0141197 A1 May 5, 2022

(30) Foreign Application Priority Data

Nov. 4, 2020 (JP) .............................. JP2020-184423

(51) Int. Cl.
*H04L 9/40* (2022.01)
(52) U.S. Cl.
CPC ...... *H04L 63/0421* (2013.01); *H04L 63/0435* (2013.01); *H04L 63/0876* (2013.01)
(58) Field of Classification Search
CPC ............. H04L 63/0421; H04L 63/0435; H04L 63/0876

USPC .......................................................... 726/26
See application file for complete search history.

(56) References Cited

U.S. PATENT DOCUMENTS

| | | | |
|---|---|---|---|
| 2019/0087892 A1* | 3/2019 | Pinski | H04L 9/0637 |
| 2019/0190720 A1 | 6/2019 | Falk | |
| 2019/0327239 A1* | 10/2019 | Ferguson | H04L 63/102 |
| 2019/0348158 A1* | 11/2019 | Livesay | G16H 10/60 |
| 2020/0167501 A1* | 5/2020 | Brannon | G06F 21/6245 |

(Continued)

FOREIGN PATENT DOCUMENTS

| | | |
|---|---|---|
| JP | 2018-196097 A | 12/2018 |
| JP | 2019-95884 A | 6/2019 |
| JP | 2019-532556 A | 11/2019 |

(Continued)

*Primary Examiner* — Michael S McNally
(74) *Attorney, Agent, or Firm* — Finnegan, Henderson, Farabow, Garrett & Dunner, LLP

(57) ABSTRACT

In a case where data is provided to a plurality of third parties, an embodiment of the present invention provides a method and the like for checking the consent and disclosure history of disclosure to the third parties while also reducing the disadvantages from a data leak. An information processing method according to an embodiment of the present invention includes writing, to a blockchain, a consent record indicating a consent with respect to the handling of data and a related party related to the consent or the data. In the case where executing the handling in the consent record would allow the data to be usable by a third party that is neither the executing party executing the handling nor the related party, the consent record is written such that the identifier is changed to a different identifier uniquely corresponding to the third party.

11 Claims, 6 Drawing Sheets

(56) References Cited

U.S. PATENT DOCUMENTS

2021/0042294 A1* 2/2021 Srivastava ............. G16H 40/20
2021/0135865 A1 5/2021 Joseph

FOREIGN PATENT DOCUMENTS

| JP | 2020-13175 A | 1/2020 |
| JP | 2020-509681 A | 3/2020 |
| JP | 2020-71810 A | 5/2020 |
| JP | 6719410 B2 | 7/2020 |

* cited by examiner

HANDLING EXECUTION RECORD
(RECEIPT FOR RETENTION)

INFORMATION PROCESSING METHOD, INFORMATION PROCESSING SYSTEM, AND INFORMATION PROCESSING APPARATUS

CROSS-REFERENCE TO RELATED APPLICATION(S)

This application is based upon and claims the benefit of priority from Japanese Patent Application No. 2020-184423, filed Nov. 4, 2020; the entire contents of which are incorporated herein by reference.

FIELD

Embodiments described herein relate generally to an information processing method, an information processing system, and an information processing apparatus.

BACKGROUND

According to the law related to the protection of personal information (hereinafter, the Personal Information Protection Law), for a business that handles personal information to provide personal data to a third party, the business is requested to obtain consent in advance from the person in question, that is, the owner of the personal data. The business that handles personal information creates a record related to the consent, and confirms the presence or absence of the consent when providing personal data to a third party.

Also, to make the flow of the disclosure of personal data traceable, when providing personal data to a third party, the business that handles personal information is requested to make a record related to the disclosure and retain the record for a certain period. For example, the business that handles personal information records an indication that personal data has been provided, together with information such as the name of the owner, the consent of the owner, the category of personal data, and the name of the recipient third party. Additionally, for example, the third party provided with the personal data, or in other words, the apparatus of the party using the personal data, checks the name of the business that handles personal information from which the data was provided and the route by which the business that handles personal information acquired the provided data, and also makes a record of receiving the personal data.

On the other hand, there are also demands to anonymize a portion of such data and records. One method of anonymization is pseudonymization. Pseudonymization refers to a method of removing all or part of a personally identifiable description, and inserting pseudonymous information such as a code instead. Through pseudonymization, the identification of individuals can be prevented even if an information leak occurs. However, it is not possible to prevent leaked data from being collated with other data on the basis of pseudonymous information.

DETAILED DESCRIPTION

In a case where data is provided to a plurality of third parties, an embodiment of the present invention provides a method and the like for checking the consent and disclosure history of disclosure to the third parties while also reducing the disadvantages from a data leak.

An information processing method according to an embodiment of the present invention includes writing, to a blockchain, a consent record indicating a consent with respect to the handling of data and a related party related to the consent or the data. In the case where executing the handling in the consent record would allow the data to be usable by a third party that is neither the executing party executing the handling nor the related party, the consent record is written such that the identifier is changed to a different identifier uniquely corresponding to the third party.

An embodiment will be explained in detail below with reference to the accompanying drawings. The present invention is not limited to the embodiment.

Embodiment of Present Invention

Figure 1:
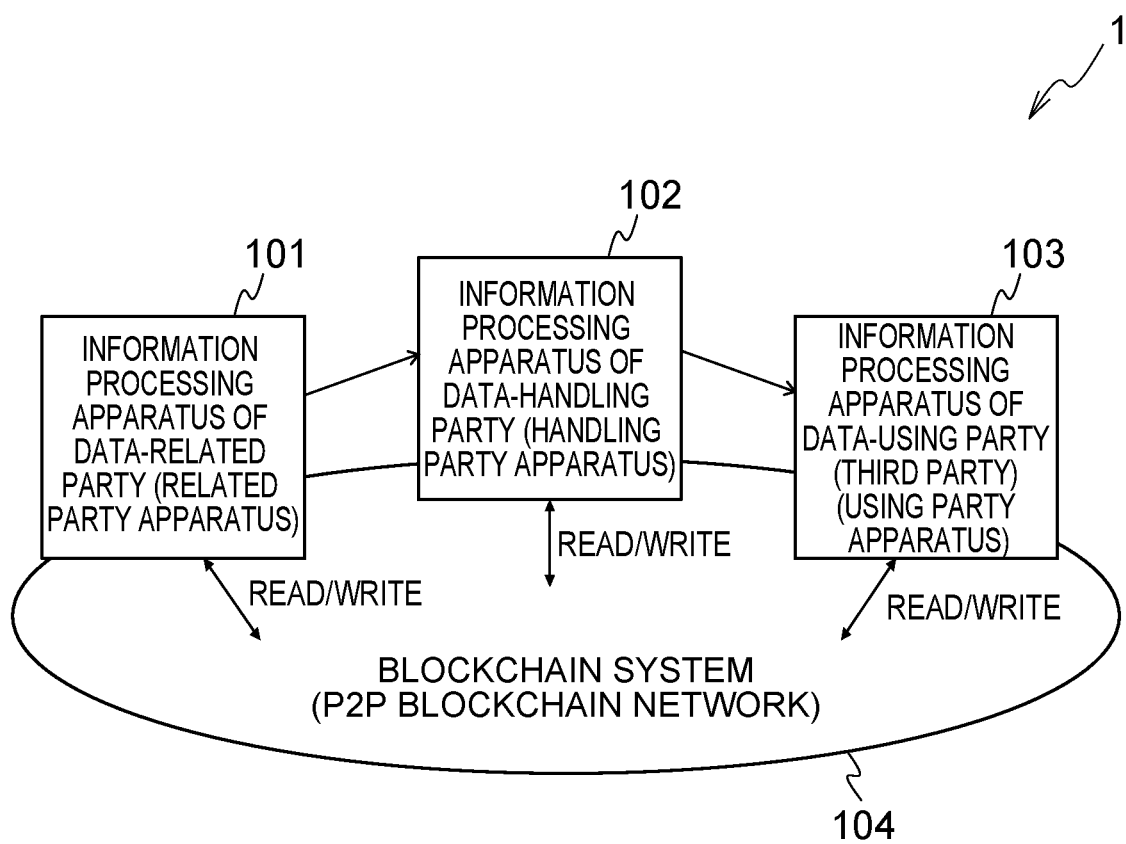
FIG. 1 is a block diagram illustrating an example of an information processing system according to an embodiment of the present invention.

FIG. 1 is a block diagram illustrating an example of an information processing system according to an embodiment of the present invention. An information processing system according to the present embodiment is provided with an information processing apparatus 101 of a data-related party, an information processing apparatus 102 of a data-handling party, an information processing apparatus 103 of a data-using party as a third party that is neither the data-related party nor the data-handling party, and a blockchain system 104. Note that for convenience, the information processing apparatus 101 of the data-related party, the information processing apparatus 102 of the data-handling party, and the information processing apparatus 103 of the third party are hereinafter referred to as the related party apparatus 101, the handling party apparatus 102, and the using party apparatus 103, respectively. Note that the related party apparatus 101, the handling party apparatus 102, and the using party apparatus 103 are not limited to a single apparatus each, and a plurality of each apparatus may exist.

In the information processing system according to the present embodiment, the handling party apparatus 102 handles data of the data-related party. Although a variety of types of handling are anticipated, one type of handling is that the handling party apparatus 102 may transmit the data to the using party apparatus 103. In other words, the data-handling party may provide the data of the data-related party to a third party, namely the data-using party. For example, the business that handles personal information (PDS business) that manages a personal data store (PDS) storing personal data is the data-handling party, and conceivably provides personal data to third parties after obtaining consent from the person in question or a representative. Note that in the case where the data-handling party does not collect data itself but receives data from the data-related party and provides the data to the data-using party, the data-handling party may be considered to be a first recipient of the data, and the data-using party may be considered to be a second recipient of the data.

Note that the data-related party, the data-handling party, and the data-using party are not particularly limited, and may be individuals or corporations. Also, the data-related party simply means the subject associated with the data, and is not particularly limited. For example, the data-related party may be a consenting party that consents to the handling of data by the data-handling party, a holder of the data, a representative of the holder. In addition, the data-related party may also be a person specified by the data. For example, the data indicates information such as address, gender, and age, and a person specified by the information may be treated as the data-related party. In this way, the data-related party is anticipated to be a party related to consent with respect to the data or to the data itself.

Furthermore, the type of data handled in the present embodiment, the method of transmitting and receiving data, and the like are not particularly limited. For example, the data in question may be personal data or industrial data.

Also, in the present embodiment, a log with respect to the data is written to a blockchain provided by the blockchain system 104. The granting of consent to the handling of data, the execution of the handling, the usability of the data as a result of executing the handling, and the like are recorded in the blockchain. For example, the disclosure of the data to a third party and actions such as analyzing, editing, or erasing the data may be recorded in the blockchain.

By leaving such a record with respect to the data, the traceability of the data is secured. For example, in the case where the data is provided to a third party, the data-related party is able to check which using party was provided with the data and the consent used as the basis for providing the data. Also, by managing the record with the blockchain, resistance against tampering with the record can be improved.

The blockchain is managed in a distributed manner by information processing apparatuses belonging to a P2P network associated with the blockchain. The P2P network may also be considered to be a network for consensus-forming with respect to the content written to blocks in the blockchain. It is sufficient for the related party apparatus 101, the handling party apparatus 102, and the using party apparatus 103 to be capable of recording the record described above to the blockchain, either directly or indirectly. In other words, the related party apparatus 101, the handling party apparatus 102, and the using party apparatus 103 may belong to the blockchain system 104, or in other words the P2P network associated with the blockchain, and write to blocks in the blockchain directly. Alternatively, the related party apparatus 101, the handling party apparatus 102, and the using party apparatus 103 may not belong to the blockchain system 104, and may request an information processing apparatus belonging to the blockchain system 104 to write the record to the blockchain. In other words, writing to the blockchain may also be achieved indirectly by sending the desired record to be written to an information processing apparatus belonging to the blockchain.

In addition, the related party apparatus 101, the handling party apparatus 102, and the using party apparatus 103 may write to blocks in the blockchain individually, or one of the apparatuses may write to blocks in the blockchain as a representative. For example, by causing the related party apparatus 101 to write a record related to consent to a block in the blockchain and causing the handling party apparatus 102 to monitor the blockchain, the consent may be recognized. Alternatively, the handling party apparatus 102 may acquire information indicating consent from the related party apparatus 101 through a medium other than the blockchain, such as email or a web page for example, and write a record related to the consent to a block in the blockchain on the basis of the information.

Note that the method of writing to the blockchain may use known technology, and is not limited in the present embodiment. For example, a digital signature may be attached to a written record to indicate security, but the digital signature may be generated from a private key of the related party apparatus 101 or from a private key of the handling party apparatus 102. Additionally, because managing private keys securely is relatively difficult for the data-related party, the management of private keys may be entrusted to the data-handling party in some cases. Consequently, the handling party apparatus 102 may also generate a digital signature from a private key of the related party apparatus 101 instead of the related party apparatus 101, and transmit the generated digital signature to the related party apparatus 101.

Note that the information processing system is not limited to the example in FIG. 1, and other acting parties may also exist. For example, it is also anticipated that the data of the related party may also be retained by a data-managing party different from the data-handling party. Under such an assumption, it is sufficient for the information processing apparatus of the data-managing party to acquire the data from the related party apparatus 101, and transmit the data to the using party apparatus 103 according to an instruction received from the handling party apparatus 102. In other words, the information processing apparatus of the data-managing party may function as a part of the handling party apparatus 102.

Figure 2:
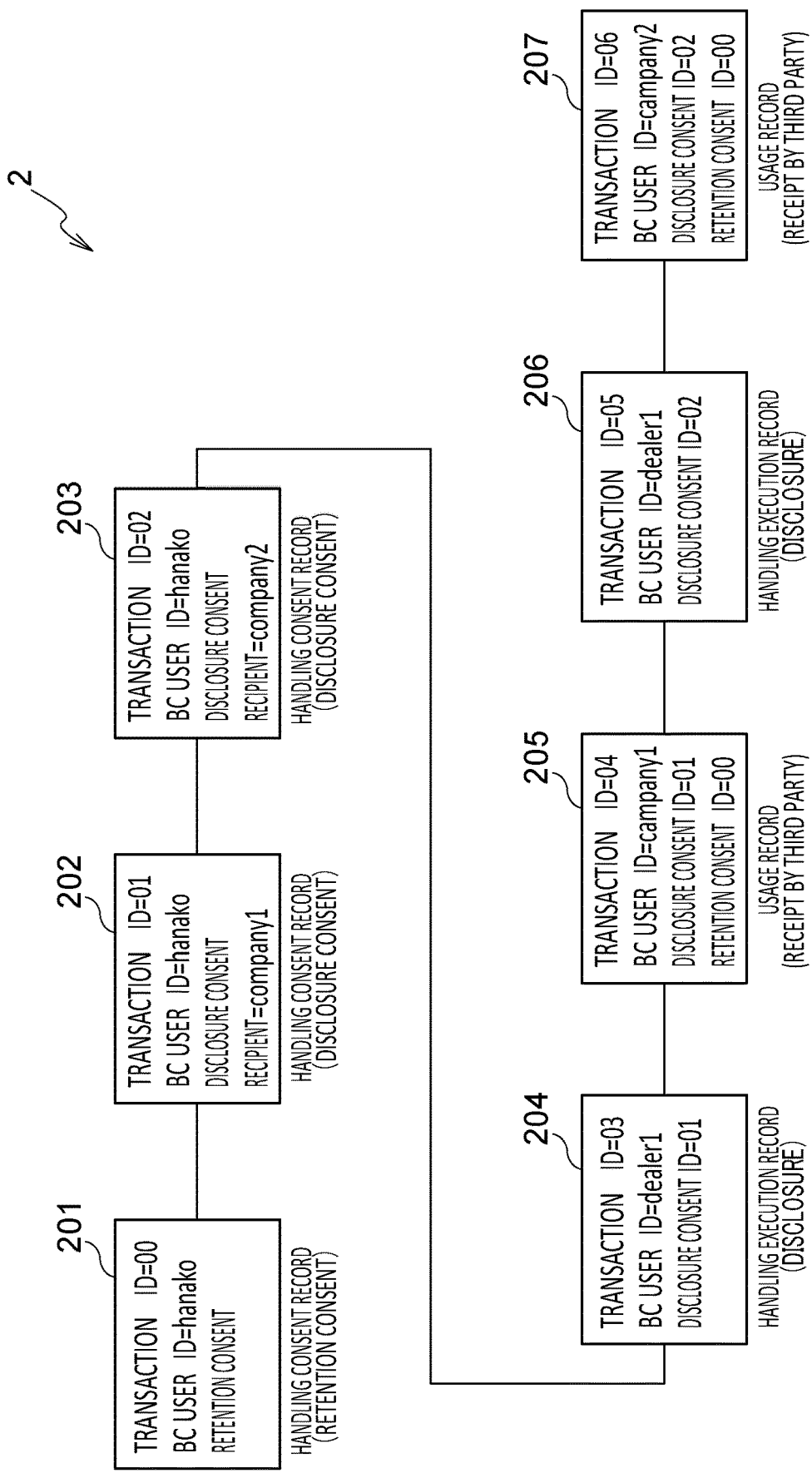
FIG. 2 is a diagram illustrating an example of a blockchain.

FIG. 2 is a diagram illustrating an example of the blockchain. FIG. 2 illustrates a blockchain 2 including blocks 201 to 207, to which records such as the data handling described above are written. A transaction ID illustrated in each of the blocks 201 to 207 is an identifier of the process (transaction) Indicated by each record. A BC user ID illustrated in each of the blocks 201 to 207 means a user ID for the blockchain, and indicates the acting party of the process indicated by each record.

For example, the block 201 illustrates a record in which the data-related party with the BC user ID "hanako" has consented to the handling of retaining data. In this description, such a record of consent with respect to the handling of data is referred to as a handling consent record.

The block 202 also illustrates a handling consent record, and the block 202 indicates that "hanako" has given disclosure-related consent such that the data-using party "company1" may receive the data. Similarly, the block 203 indicates that "hanako" has given consent such that the data-using party "company2" may receive the data.

Also, the block 204 illustrates a record indicating that a handling party with the BC user ID "dealer1" has provided the data on the basis of the record "disclosure consent ID=01". Here, "disclosure consent ID=01" expresses the handling consent record of "transaction ID=01" illustrated in the block 202. Consequently, the record of the block 204 indicates that data has been provided to "company1" on the basis of the consent given by "hanako". In this description, such a record of the execution of data handling is referred to as a handling execution record.

Through the disclosure illustrated in the block 204, "company1" receives the data, and a record of the receipt is illustrated in the block 205. In the block 205, the BC user ID is denoted "company1", which indicates that the receiver of the data is the data-using party "company1". In this way, a record indicating that data has become usable or has been used by a data-using party is written to the blockchain. Such a record is hereinafter referred to as a usage record.

Here, "disclosure consent ID=01" illustrated in the usage record of the block 205 indicates that the received data was provided on the basis of the disclosure consent with the transaction ID "01", namely the disclosure consent illustrated in the block 202. Also, "retention consent ID=00" Illustrated in the usage record of the block 205 indicates that the data-handling party had been retaining the received data on the basis of the retention consent with the transaction ID "00", namely the retention consent illustrated in the block 201. In this way, the inclusion of information indicating the handling consent record in the usage record clarifies that the data-related party has given consent with respect to the data used by the data-using party, and the legitimacy of the data usage by the third party can be recognized. Note that the handling consent record indicated in the usage record is detected by treating the BC user ID of the data-related party, which is "hanako" in the example of FIG. 2, as a search key.

The block 206 is also a handling execution record related to data disclosure, and indicates that "dealer1" has provided the data to a third party on the basis of the record with the transaction ID "02". Additionally, the record with the transaction ID "02" can be referenced to ascertain that the data recipient is "company2". Furthermore, the block 207 illustrates a usage record indicating that "company2" has received the data.

Note that various information may be stated in a record. For example, a handling consent record related to retention may indicate from where the handling party acquired the data, or in other words, the source of the data. As another example, in some cases, a handling consent record related to disclosure may include a symbol indicating that all of the data may be provided, or include information such as data categories indicating which portions of the data may be provided. Also, the recipient of the data may be indicated explicitly, or may be omitted if the recipient can be ascertained by referencing another record as described above.

Also, in the example of FIG. 2, a single record is written to a single block, but records and blocks do not necessarily need to exist in a one-to-one relationship, and a plurality of records may also be written to a single block. For example, a handling consent record related to retention and a handling consent record related to disclosure may be written to a single block. Also, a plurality of content may be described inside a single record. For example, a plurality of consents, such as for retention and disclosure, may be included in a single handling consent record. Alternatively, consent related to retention for each of a plurality of related parties may be included in a single retention/handling consent record. Also, in the case where a plurality of data is provided at once on the basis of a plurality of consents, a plurality of handling consent records related to data disclosure may be indicated by a handling execution record related to the data disclosure.

A record may also be written to a block in any way, insofar as necessary information can be read from the block. For example, all or part of a record may also be included in a block as metadata.

By writing records to a blockchain in this way, traceability can be secured. Note that because the blocks in the blockchain are usable by the information processing apparatuses belonging to the P2P network associated with the blockchain, anonymity is a problem, but countermeasures are also implemented. For example, in FIG. 2, the BC user ID is indicated by the identifier "hanako", but if the identifier is unrelated to the actual name of an individual, identifying the individual is difficult. Additionally, a technique of pseudonymization may be implementing in which a personal name is replaced by another character string, number, or the like on the basis of a predetermined rule.

However, in the case where "company2" that has received the data leaks the data, "company1" is able to use the leaked data by collating the data using "hanako" as a search key. This is disadvantageous to the data-handling party. For example, in the case where "company1" has received data related to the income of "hanako" and "company2" has received data related to the educational background of "hanako", if "company1" leaks the data related to the income of "hanako", "company2" is able to acquire the data related to the income and the data related to the educational background of "hanako". In other words, "company2" does not need to purchase the data related to the income of "hanako" from the handling party apparatus 102.

In the present embodiment, to avoid such a situation, records in the blocks are improved while also securing traceability.

Figure 3:
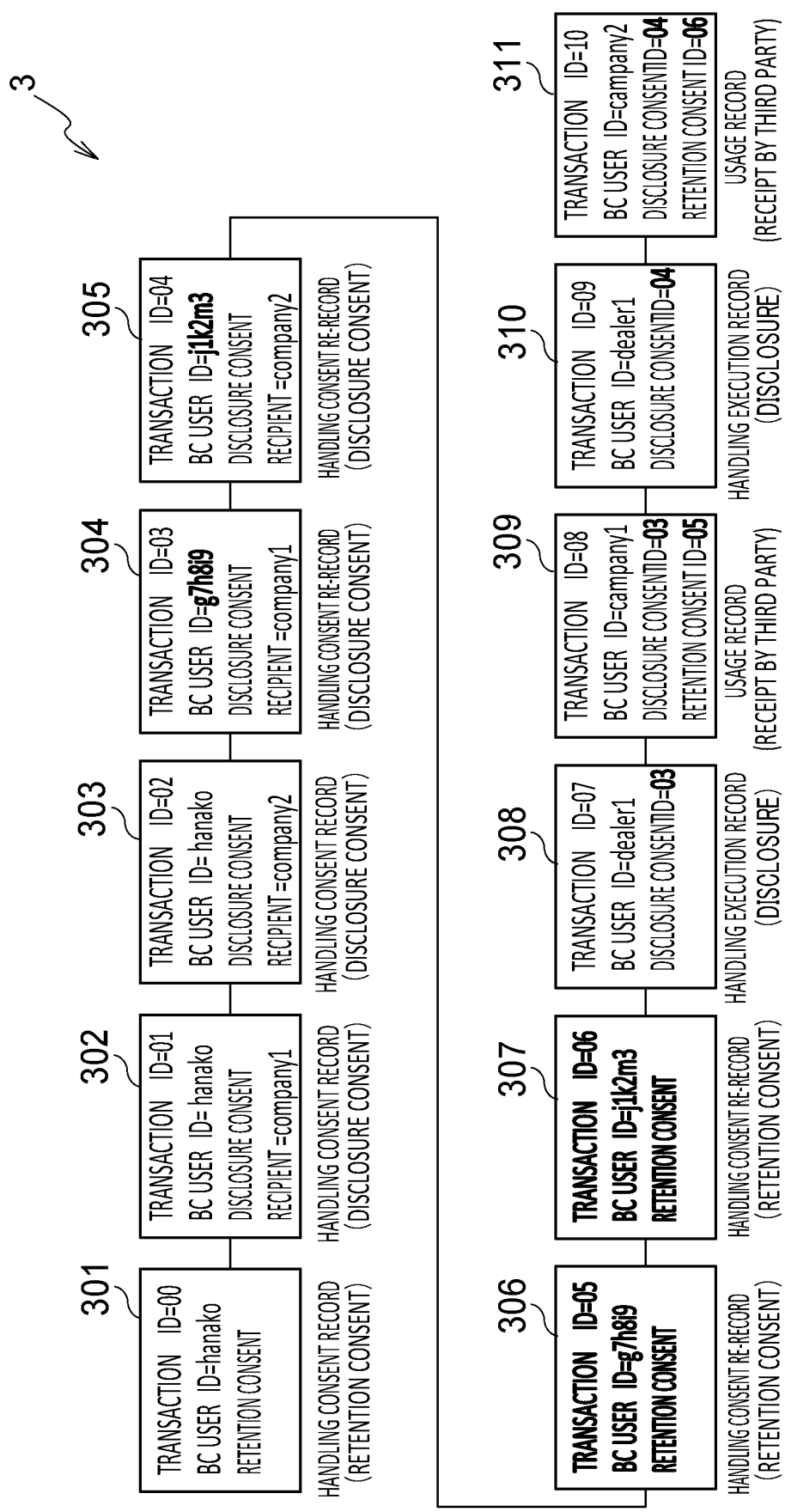
FIG. 3 is a diagram illustrating an example of an improved blockchain.

FIG. 3 is a diagram illustrating an example of an improved blockchain. A block 301 in the blockchain of FIG. 3 illustrates a handling consent record consenting to the retention of data, and is the same as the block 201 of the blockchain in FIG. 2. Additionally, blocks 302 and 303 also illustrate handling consent records indicating that data may be provided, and are the same as the blocks 202 and 203 in FIG. 2.

On the other hand, blocks 304 and 305 are newly added blocks that do not correspond exactly with any of the blocks in the blockchain of FIG. 2. The blocks 304 and 305 illustrate the same handling consent records as the blocks 302 and 303, respectively, except that the BC user ID is different. The BC user IDs illustrated in the blocks 304 and 305 have been changed according to the using party, or in other words, have been pseudonymized for each using party, and are identifiers that uniquely correspond to each using party.

Blocks 306 and 307 are also newly added blocks that do not correspond exactly with any of the blocks in the blockchain of FIG. 2. The blocks 306 and 307 illustrate the same handling consent record as the block 301, except that the BC user ID is different.

A block 308 is a handling execution record related to data disclosure, and a block 309 is a usage record related to data receipt corresponding the data disclosure. The blocks 308 and 309 correspond to the blocks 204 and 205, respectively, but information such as the disclosure consent ID is different compared to the blocks 204 and 205.

Similarly, a block 310 is a handling execution record related to data disclosure, a block 311 is a usage record related to data receipt. The blocks 310 and 311 correspond to the blocks 206 and 207, respectively, but information such as the disclosure consent ID is different compared to the blocks 206 and 207.

Note that various information may be added to a record. For example, information indicating the type of record may be included. For example, details about the data to be provided may be added. In the case of providing a portion of data handed over from the related party apparatus 101 to the using party apparatus 103, information enabling the portion to be recognized, such as one or more category names or positions inside the data for example, may also be recorded. Additionally, a plurality of handling party apparatuses 102 may exist in some cases. Consequently, the BC user ID of the handling party apparatus 102 may also be included in the record.

Figure 4:
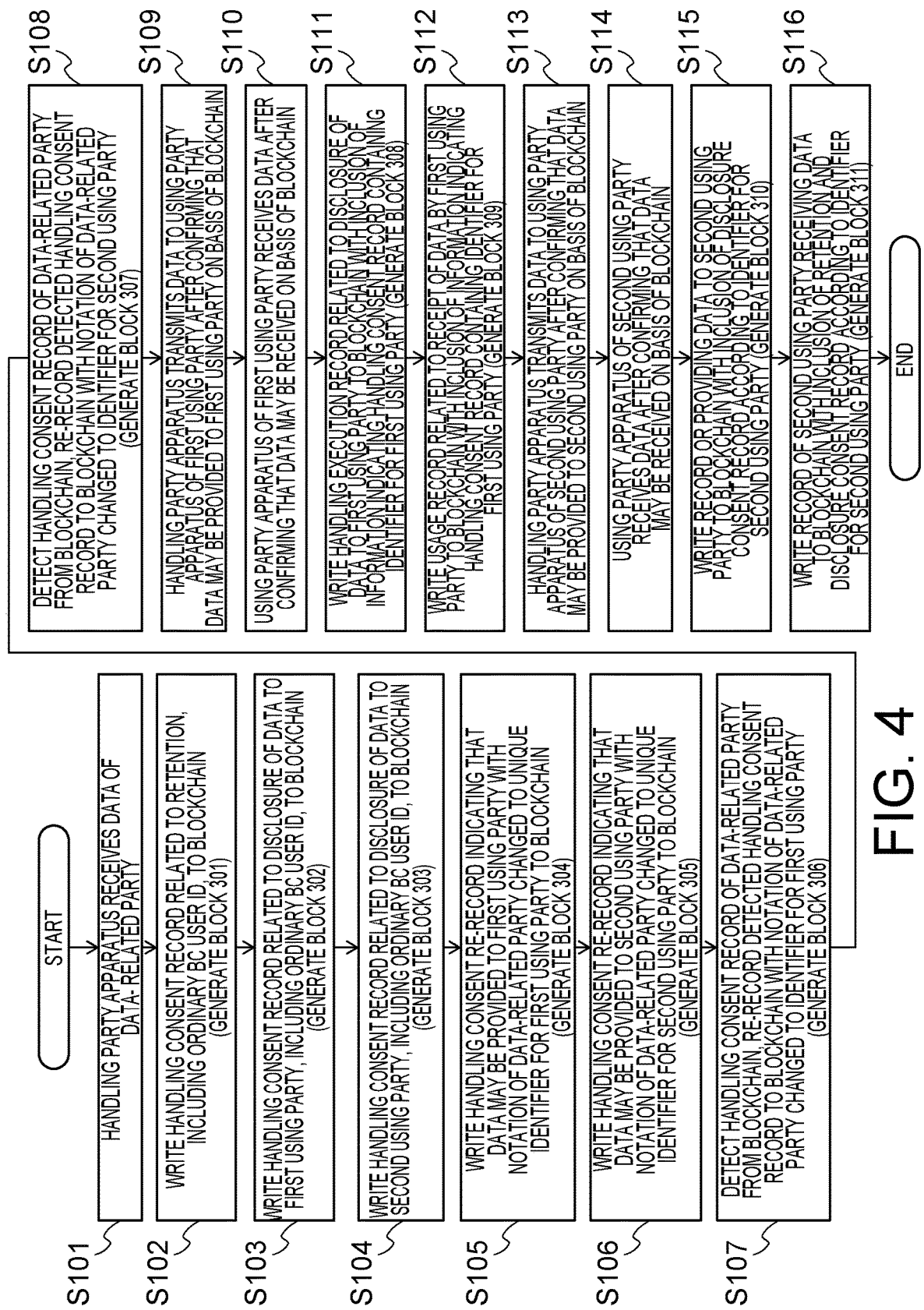
FIG. 4 is a schematic flowchart of an overall process according to an embodiment of the present invention.

A flow by which the blocks 301 to 307 illustrated in FIG. 3 are generated will be described. FIG. 4 is a schematic flowchart of an overall process according to the present embodiment.

Note that as described above, the acting party that writes to the blockchain may change, and therefore in the following flow, the record to be written is described as the grammatical subject. Also, in the following flow, the flow of data is described prior to the writing to the blockchain for convenience, but the flow of data and the writing to the blockchain may also be performed in reverse order or at the same time. For example, data may be received after a retention handling consent record is written, or a retention handling consent record may be written after data is received together with the retention consent. Also, in the case of handling a plurality of data in parallel, multiple instances of the following flow are processed in parallel.

The handling party apparatus 102 receives data of the data-related party (S101). The source of the data may be the related party apparatus 101 or another information processing apparatus. Additionally, consent allowing the data-handling party to store the data is established, and a handling consent record regarding the consent is written to the blockchain (S102). With this arrangement, the block 301 in FIG. 3 is generated.

Furthermore, consent allowing the data to be provided to a first using party is established, and a handling consent record indicating that the data may be provided to the first using party (in the example of FIG. 3, "company1") is written to the blockchain using an ordinary identifier that does not uniquely correspond to the using party (in the example of FIG. 3, "hanako") as the BC user ID of the data-related party (S103). Also, consent allowing the data to be provided to a second using party is established, and a handling consent record indicating that the data may be provided to the second using party is written to the blockchain using an ordinary identifier that does not uniquely correspond to the using party as the BC user ID of the data-related party (S104). With this arrangement, the block 302 and the block 303 in FIG. 3 are generated.

Furthermore, the handling consent record in the block 302 is rewritten to the blockchain with the notation of the data-related party changed to a unique identifier (in the example of FIG. 3, "g7h8i9") for the first using party (S105). Furthermore, the handling consent record in the block 303 is rewritten to the blockchain with the notation of the data-related party changed to a unique identifier (in the example of FIG. 3, "j1k2m3") for the second using party (S106). With this arrangement, the block 304 and the block 305 in FIG. 3 are generated.

Through the disclosure of data, a data-using party is able to use the data. In the case of a handling consent record related to data handling such as data disclosure that, if executed, allows a using party to use data, the handling consent record is rewritten with the notation of the data-related party changed to an identifier uniquely corresponding to the using party. Note that the newly written record is also a handling consent record, but will be referred to as a handling consent re-record to distinguish from the handling consent record written using the ordinary BC user ID.

Note that the identifier uniquely corresponding to the using party may be determined appropriately. All or part of the ordinary BC user ID may be converted according to a predetermined rule, or a unique identifier may be newly assigned. For example, the ordinary BC user ID may be converted on the basis of an individual key possessed by each third party. The ordinary BC user ID may also be converted on the basis of a combination of an individual key possessed by each third party and an individual key possessed by the data-related party. The ordinary BC user ID may also be encrypted.

Next, the records for the data-related party expressed by the identifier for each using party are made to be traceable with the identifier. For example, if it is unknown that "g7h8i9" corresponds to "hanako", the blocks 301 to 305 alone cannot be used to recognize if the data-related party corresponding to "g7h8i9" has given consent regarding the retention of data. Consequently, an information processing apparatus such as the handling party apparatus 102 that recognizes the correspondence relationship between the identifiers before and after the change detects the handling consent record in which the data-related party is expressed by the ordinary BC user ID (in the example of FIG. 3, "hanako"), and rewrites the detected handling consent record to the blockchain with the notation of the data-related party changed to the identifier for the first using party (in the example of FIG. 3, "g7h8i9") (S107). With this arrangement, the block 306 is generated. With the block 306, even a using party that only knows the BC user ID "g7h8i9" can recognize that the data-related party corresponding to "g7h8i9" has consented to retention.

Similarly, a detected handling consent record is rewritten to the blockchain with the notation of the data-related party changed to a unique identifier (in the example of FIG. 3, "j1k2m3") for the second using party (S108). With this arrangement, the block 307 indicating the handling consent re-record for the handling consent record in the block 305 is generated.

Thereafter, suppose that the handling party apparatus 102 attempts to provide data to the first using party. In this case, the handling party apparatus 102 first confirms that the data may be provided to the first using party on the basis of the blockchain, and then transmits the data to the using party apparatus 103 of the first using party (S109). On the other hand, the using party apparatus 103 of the first using party that receives the provided data first confirms that the data is receivable on the basis of the blockchain before receiving the data (S110). Note that the handling party apparatus 102 and the using party apparatus 103 may reference the blockchain directly to check whether data is providable and receivable, or another information processing apparatus belonging to the blockchain system 104 may determine whether the data is providable and receivable on behalf of the handling party apparatus 102 and the using party apparatus 103. Note that causing a large number of information processing apparatuses belonging to the blockchain system 104 to determine whether the data is providable and receivable has the merit of ensuring transparency in the determination.

Whether or not the data is providable and receivable may also be checked using the BC user ID corresponding to the recipient using party apparatus 103. In the example of FIG. 3, in the case of attempting to provide data about "hanako" to "company1", the BC user ID "g7h819" of "hanako" for "company1" is used as a search key to detect handling consent records. With this arrangement, the blocks 304 and 306 in which "g7h8i9" is written in the handling consent record are detected, and it is determined that consent related to disclosure and retention has been established.

Thereafter, a handling execution record related to the disclosure of data to the first using party is written to the blockchain with the inclusion of information indicating the handling consent record that contains the identifier for the first using party (S111). Also, a usage record related to the receipt of data by the first using party is written to the blockchain with the inclusion of information indicating the handling consent record that contains the identifier for the first using party (S112). Note that in the above handling execution record and usage record, ordinary identifiers other than the identifier for the first using party, such as the identifier for the second using party, are removed and not included in the handling execution record to prevent the data collation described earlier. With this arrangement, the blocks 308 and 309 are generated. The block 308 includes the transaction ID 03 of the handling consent record related to disclosure containing the identifier "g7h8i9" for the first using party. On the other hand, the block 309 includes the transaction IDs 03 and 05 of the handling consent records related to disclosure and retention containing the identifier "g7h8i9" for the first using party.

In the case where the handling party apparatus 102 attempts to provide data to the second using party, a process similar to the case of attempting to provide data to the first using party is performed. The handling party apparatus 102 first confirms that the data may be provided to the second using party on the basis of the blockchain, and then transmits the data to the using party apparatus 103 of the second using party (S113). On the other hand, the using party apparatus 103 of the second using party that receives the provided data first confirms that the data is receivable on the basis of the blockchain before receiving the data (S114). Additionally, a handling execution record related to the disclosure of data to the second using party is written to the blockchain with the inclusion of information indicating the handling consent record that contains the identifier for the second using party (S115). Also, a usage record related to the receipt of data by the second using party is written to the blockchain with the inclusion of information indicating the handling consent record that contains the identifier for the second using party (S116). With this arrangement, the blocks 310 and 311 are generated, and the IDs indicating the handling consent records included in the blocks 310 and 311 all indicate the handling consent records related to the identifier "j1k2m3" for the second using party. With this arrangement, the blocks 308 and 310 are both handling execution records related to disclosure, but because the recipient using parties are different, the disclosure consent IDs included in each are different. Also, the blocks 309 and 311 are both usage records related to receipt, but because the receiving using parties are different, the disclosure consent IDs and the retention consent IDs included in each are different.

If records are written to the blockchain in this way, a history of consent with respect to disclosure to third parties and the disclosure can be checked while also reducing the disadvantages arising from data leaks such as collation. For example, by using the ordinary BC user ID as a search key to read out the handling consent records written to blocks on the blockchain, the data-related party can check that consent was given intentionally. In the example of FIG. 3, the related party apparatus 101 can use "hanako" as a search key to detect the blocks 301, 302, and 303, and confirm that the retention consent, the disclosure consent with respect to the first using party referred to as "company1", and the disclosure consent with respect to the second using party referred to as "company2" are valid. In addition, the using party apparatus 103 of the first using party can use the identifier "g7h8i9" for the first using party as a search key to detect the blocks 304 and 306, and confirm that consent to provide the received data has been given, and the acquisition route is unambiguous. Likewise, the using party apparatus 103 of the second using party can use the identifier "j1k2m3" for the second using party as a search key to detect the blocks 305 and 307, and confirm consent similar to the above. Consequently, traceability is secured.

Additionally, the first using party does not recognize that the identifier "j1k2m3" for the second using party represents the same data-related party as the identifier "g7h8i9" for the first using party. Likewise, the second using party does not recognize that the identifier "g7h8i9" for the first using party represents the same data-related party as the identifier "j1k2m3" for the second using party. For this reason, even if one of either the first using party or the second using party leaks data, the other party would be unable to collate the data. Consequently, the disadvantages from a data leak can be reduced.

Note that the data-related party knows the ID for each data-using party, and the generation of the blocks 302 and 303 may also be skipped depending on the specifications, such as in the case where traceability can be secured with the ID for each data-using party. Also, in the case of skipping the generation of the blocks 302 and 303 or the like, it is sufficient to check if consent for retention, disclosure, and the like has been given by querying an information processing apparatus that recognizes the correspondence relationship between the ordinary identifier and the unique identifier for each using party.

Note that the related party apparatus 101 may also rescind a disclosure consent after having consented to data disclosure. For this reason, when providing data, the ability to confirm that disclosure consent has not been rescinded is preferable. Namely, in the case where the related party apparatus 101 rescinds a data disclosure consent, a record of rescinding the disclosure consent is preferably written to the blockchain, and when providing data, the handling party apparatus 102 preferably searches the blockchain using the BC user ID of the related party apparatus 101 as a search key to determine whether the disclosure consent has been rescinded. Note that in the case where a validity period is indicated by a disclosure consent, it is preferable to confirm that the validity period indicated by the disclosure consent has not expired. In this way, when providing data, it is preferable to confirm the validity of the disclosure consent.

Note that although only the data-handling party "dealer1" is described above, a plurality of handling parties may also exist in some cases. In such cases, the BC user ID of the data-related party may be changed for each of the plurality of data-handling parties. Also, the BC user ID of the data-related party may be changed for each combination of a data-handling party and a data-using party. For example, "g7h8i9" is used in the handling consent record for data disclosure from the data-handling party "dealer1" to the data-using party "company1", but using a different identifier from "g7h8i9" in the handling consent record for data disclosure from a different data-handling party "dealer2" to the data-using party "company1" makes it possible to reduce the disadvantages from a data leak.

Note that the blockchain in FIG. 3 is an example, and as described above, a variety of records may be written to the blockchain. For example, handling execution records other than data disclosure, such as a record of a data-handling party receiving the data of a data-related party according to a data retention consent, may also be written. As another example, usage records other than data receipt, such as a record of a data-using party executing data analysis, editing, erasure, or the like, may also be written. Furthermore, various information may be included in a record insofar as the information does not contribute to data collation. For example, a usage record related to receipt may also include information such as a category of the received data and the BC user ID of the handling party apparatus 102 that provided the data.

Figure 5:
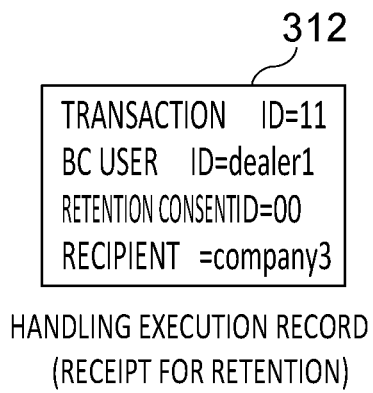
FIG. 5 is a diagram illustrating an example of another record.

FIG. 5 is a diagram illustrating an example of another record. FIG. 5 illustrates a block 312 indicating a handling execution record indicating that the handling party apparatus 102 has received data. In the block 312, the statement "retention consent ID=00" is illustrated as the basis of the data receipt. Also, the statement "source=company3" indicates that the party that actually transmitted the data is "company3" rather than the data-related party "hanako". As described above, the data may also be received from a different information processing apparatus such as the apparatus of a data-managing party rather than from the related party apparatus 101. In such cases, the source providing the data may also be included in the record.

Note that the transaction ID indicated in the block 312 is assigned as the next number after the block 311 in FIG. 3 for convenience, but this does not mean that the block 312 is generated after the block 311.

As above, according to the present embodiment, a handling consent record such as a disclosure handling consent record related to handling that allows a third party to use data is recorded to the blockchain with a modified identifier of the related party. Furthermore, a handling consent record preceding the above record and in which the identifier of the related party has not been changed is detected, and the detected handling consent record is re-recorded after changing the identifier of the related party. With this arrangement, even if the data is leaked from the third party, the collation of data between third parties can be prevented, while in addition, a party that only recognizes one of the identifiers before and after the change is able to use the identifier check the complete route and history of the disclosure of the data.

Note that at least a portion of the information processing apparatus according to the above embodiment may also be achieved by a special-purpose electronic circuit (that is, hardware) such as an integrated circuit (IC) in which components such as a processor and a memory are implemented. Moreover, at least a portion of the above embodiment may also be achieved by executing software (a program). For example, the processes according to the above embodiment are achievable by using a general-purpose computer apparatus as the base hardware and causing a processor such as a CPU mounted in the computer apparatus to execute a program.

For example, by causing a computer to read out special-purpose software stored in a computer-readable storage medium, the computer can function as an apparatus according to the above embodiment. The type of the storage medium is not particularly limited. Furthermore, the computer can function as an apparatus according to the above embodiment by causing the computer to install special-purpose software downloaded over a communication network. In this way, information processing expressed as software is carried concretely by using hardware resources.

Figure 6:
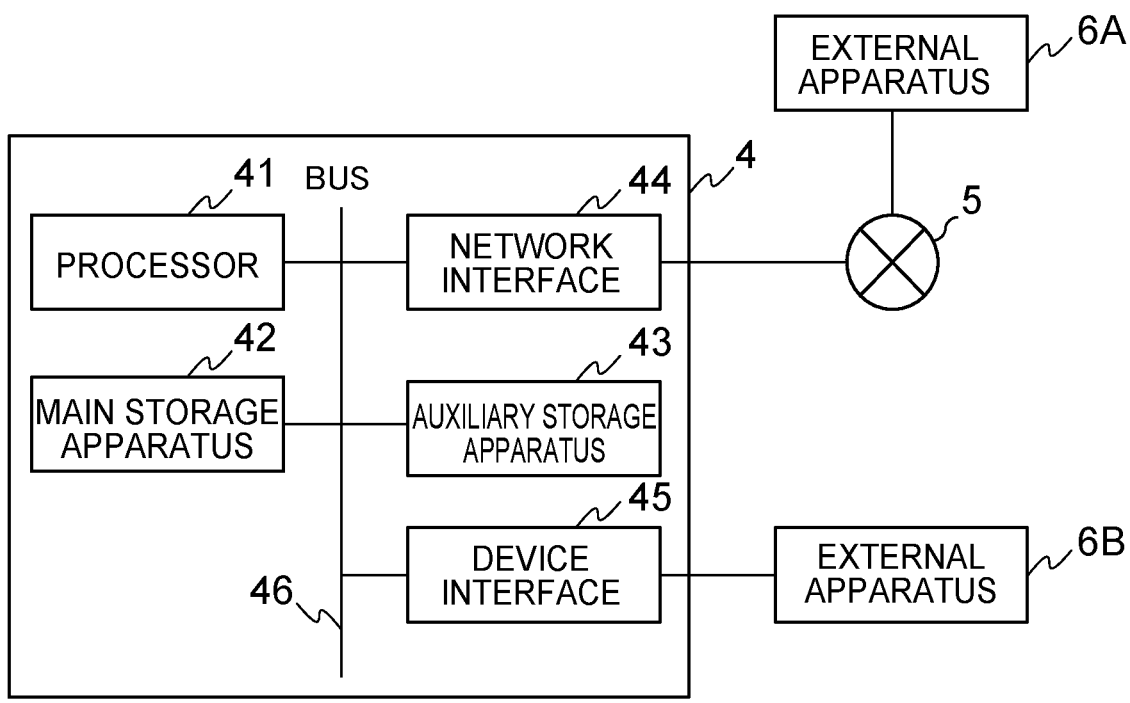
FIG. 6 is a block diagram illustrating an example of a hardware configuration according to an embodiment of the present invention.

FIG. 6 is a block diagram illustrating an example of a hardware configuration according to an embodiment of the present invention. The information processing apparatus according to the present embodiment can be achieved as a computer apparatus 4 provided with a processor 41, a main storage apparatus 42, an auxiliary storage apparatus 43, a network interface 44, and a device interface 45 interconnected through a bus 46.

The processor 41 is an electronic circuit including a computer control apparatus and computational apparatus. The processor 41 performs computational processing on the basis of data and programs inputted from sources such as each apparatus in the internal configuration of the computer apparatus 4, and outputs a computational result or a control signal to destinations such as each apparatus. Specifically, the processor 41 executes programs such as an operating system (OS) and applications of the computer apparatus 4, and controls each apparatus forming the computer apparatus 4. The processor 41 is not particularly limited insofar as the above processing can be performed.

The main storage apparatus 42 is a storage apparatus that stores information such as command to be executed by the processor 41 and various data, and the information stored in the main storage apparatus 42 is read out directly by the processor 41. The auxiliary storage apparatus 43 is a storage apparatus other than the main storage apparatus 42. Note that these storage apparatuses refer to any electronic component capable of storing electronic information, and may be memory or storage. Also, the memory may be either or both of volatile memory and non-volatile memory.

The network interface 44 is an interface for connecting to a communication network 5 in a wired or wireless configuration. An interface conforming to an existing communication standard may be used as the network interface 44. Through the network interface 44, information may be exchanged with an external apparatus 6A communicably connected over the communication network 5.

The device interface 45 is an interface such as USB that directly connects to an external apparatus 6B. The external apparatus 6B may be an external storage medium, or a storage apparatus such as a database.

The external apparatuses 6A and 6B may also be output apparatuses. For example, the output apparatuses may be a display apparatus for displaying images and an apparatus that outputs sound or the like. For example, the output apparatuses may be a liquid crystal display (LCD), a cathode ray tube (CRT), a plasma display panel (PDP), or a speaker, but are not limited to the above.

Note that the external apparatuses 6A and 6B may also be input apparatuses. The input apparatuses are provided with devices such as a keyboard, a mouse, and a touch panel, and supply information inputted through these devices to the computer apparatus 4. Signals from the input apparatuses are outputted to the processor 41.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing method comprising:
    writing, to a blockchain, a consent record indicating a consent with respect to a handling of data and an identifier expressing a related party that is related to the consent or the data, wherein
    in a case where executing the handling in the consent record would allow the data to be usable by a third party that is neither an executing party executing the handling nor the related party, the consent record is written such that the identifier is changed to a different identifier uniquely corresponding to the third party.

2. The information processing method according to claim 1, further comprising:
   detecting, from the blockchain, a consent record that expresses the related party with an identifier that does not uniquely correspond to the third party in a case where a consent record in which a notation of the related party is an identifier uniquely corresponding to the third party has been written; and
   writing the detected consent record to the blockchain again after changing the notation of the related party to the identifier uniquely corresponding to the third party.

3. The information processing method according to claim 2, further comprising:
   writing, to the blockchain, a handling execution record indicating that the handling indicated by a consent record in which the notation of the related party is an identifier uniquely corresponding to the third party has been executed, wherein
   in the writing of the handling execution record, information enabling detection of the consent record with respect to the handling in the handling execution record and in which the notation of the related party is set with the identifier uniquely corresponding to the third party is included in the handling execution record.

4. The information processing method according to claim 3, wherein
   in the writing of the handling execution record, information enabling detection of a consent record in which the notation of the related party is an identifier other than the identifier uniquely corresponding to the third party is removed from the handling execution record.

5. The information processing method according to claim 1, further comprising:
   writing, to the blockchain, a handling execution record indicating that the handling indicated in the consent record has been executed.

6. The information processing method according to claim 1, further comprising:
   writing, to the blockchain, a usage record indicating that the data is usable by the third party or that the third party has used the data.

7. The information processing method according to claim 6, wherein
   in the writing of the usage record, at least one consent record in which the notation of the related party is an identifier uniquely corresponding to the third party is detected from the blockchain, and the identifier in the detected consent record is included in the usage record.

8. The information processing method according to claim 1, wherein
   the handling by which the data is usable by the third party is providing the data to the third party, and
   the identifiers of the related party indicated in each consent record consenting to providing the data to respective third parties are different from each other.

9. The information processing method according to claim 1, wherein
   a consent record in which the identifier is changed to a different identifier uniquely corresponding to the third party and also a consent record in which the identifier is an identifier that does not uniquely correspond to the third party are written to the blockchain.

10. An information processing system comprising a first information processing apparatus, a second information processing apparatus configured to handle data from the first information processing apparatus, and a plurality of third information processing apparatuses configured to use the data from the second information processing apparatus, wherein
   at least one of the first information processing apparatus and the second information processing apparatus directly or indirectly writes, to a blockchain, a consent record indicating a consent with respect to a handling of the data and a related party related to the consent or the data, and
   when writing the consent record to the blockchain, in a case where the consent record relates to a handling that would allow the data to be usable by the third information processing apparatuses, at least one of the first information processing apparatus and the second information processing apparatus sets a notation of the related party to an identifier prescribed differently for each third information processing apparatus.

11. An information processing apparatus that writes, to a blockchain, a consent record indicating a consent with respect to a handling of data and a related party that is related to the consent or the data, wherein
   when writing the consent record to the blockchain, in a case where the consent record relates to a handling that, when executed, would allow the data to be usable by a third party that is neither an executing party executing the handling nor the related party, the information processing apparatus sets a notation of the related party to an identifier uniquely corresponding to the third party.

* * * * *